3,808,140
ANTIMONY-VANADIUM CORROSION INHIBITORS FOR ALKANOLAMINE GAS TREATING SYSTEM

Blake F. Mago, 10 Elyse Drive, New City, N.Y. 10956, and Charles W. West, 301 78th St., Niagara Falls, N.Y. 14304
No Drawing. Continuation-in-part of abandoned application Ser. No. 54,595, July 13, 1970. This application Nov. 22, 1971, Ser. No. 201,131
Int. Cl. C23f 11/18
U.S. Cl. 252—389 R  15 Claims

ABSTRACT OF THE DISCLOSURE

Corrosion of metallic surfaces by aqueous alkanolamine solutions employed in acid gas removal service can be inhibited by combinations of antimony and vanadium compounds.

---

This is a continuation-in-part of Ser. No. 54,595 filed July 13, 1970, now abandoned.

BACKGROUND OF THE INVENTION

This invention relates to novel corrosion inhibitors for alkanolamine-gas treating systems.

Gases such as natural gas, flue gas and synthesis gas have been purified by the utilization of aqueous alkanolamine solutions for the absorption of acid gases such as $CO_2$, $H_2S$ and $COS$ contained in the gas stream. Ordinarily, a 5 percent to 30 percent alkanolamine solution (e.g., a monethanolamine solution) flows counter current to the gas stream in an absorption column in order to remove the acid gases. An advantage of such a system is that the process is a continuous cyclic one and the reaction can thus be reversed at higher temperatures in order to liberate the acid gases from the solution.

When steel parts or components are used in such a system, it has been found that both general and local corrosive attack can occur. This is a particular problem in reboilers and heat exchangers where the steel is exposed to a hot, protonated alkanolamine solution. A heat transferring metal surface appears to be especially vulnerable. Previous investigation by others have revealed that under certain conditions corrosive products such as aminoacetic, glycolic, oxalic and formic acids were formed. The monoethanolamine salts of these acids present the possibility of increased attack upon ferrous metals. Furthermore, the carbonate salt of monoethanolamine can be converted to additional products such as N(2-hydroxyethyl) ethylenediamine which has been found to increase corrosivity towards steel particularly under heat transfer conditions.

There are various alternatives available in order to decrease corrosion rates, among them (1) the provision of a side-stream reclaimer to remove corrosive degradation products, (2) the employment of more corrosive resistant construction materials, (3) greater control of the process conditions and (4) the inclusion of corrosion inhibitors. From both cost and efficiency standpoints, the last alternative is preferred. However, certain corrosion inhibitors indicated to be effective have not gained industry-wide acceptance possibly because of an inability to provide continuing protection in certain respects.

SUMMARY OF THE INVENTION

It has now been found that the corrosion of metallic surfaces by aqueous alkanolamine solutions employed in acid gas removal service can be inhibited by an inhibiting amount of corrosion inhibitors including combinations of antimony compounds and vanadium compounds which are at least partially soluble in said aqueous alkanolamine solutions, stannous salts, organo-tin compounds, nitro aromatic acids and their salts and benzotriazole. The corrosion inhibitors described herein are especially useful in the aqueous monoethanolamine scrubbers employed in ammonia plant systems for the production of hydrogen.

Antimony compounds have been used previously as inhibitors for preventing attack of ferrous metals by aqueous monoethanolamine solutions. One hypothesis of those who have previously worked with antimony-containing compounds in acid solutions is that they function as iron or steel inhibitors by being reduced to form a deposit of antimony on the metal surface, and that inhibition results from its relatively high hydrogen overvoltage or increased polarization of local action cathodes. There is also the possibility of a secondary anodic contribution as well.

Vanadates have been known in the past to be iron or steel corrosion inhibitors but have not been utilized widely for this purpose. The oxidation states of vanadium would suggest that the vanadates may function as oxidant-type inhibitors.

It has also been found that in spite of the differences in inhibiting mechanisms by antimony and vanadium compounds, the combination of the two additives is surprisingly superior to each one alone at the same concentration.

The term "partially soluble" as used in this invention is intended to mean solubilities as low as about 0.01 gram per 100 ml. of aqueous alkanolamine solutions employed in acid gas removal service.

The choice of vanadium compounds is not critical since it is the vanadium-containing anion particularly vanadium in the plus 4 or 5 valence state which provides this unusual corrosion inhibiting property in combination with antimony ions. Thus, for example, one can employ vanadium oxide such as $VO$, $V_2O_3$, $VO_2$, $V_2O_5$ and the like; vanadium cyanides such as $K_4V(CN)_6 \cdot 3H_2O$, $K_3V(CN)_6$, $2KSCN \cdot VO(SCN)_2 \cdot 5H_2O$ and the like; vanadium halides, such as, fluorides, including $VF_3$, $VF_3 \cdot 3H_2O$, $VF_4$, $VOF_2$, $VF_5$ or $VOF_3$, chlorides including $VCl_2$, $VCl_3$, $VCl_3 \cdot 6H_2O$, $VOCl$, $VOCl_2$, $VOCl_3$, $V_2O_2Cl$, $V_2O_3Cl_2 \cdot 4H_2O$ or $VO_2Cl_2 \cdot 8H_2O$, bromides including $VBr_3$, $VBr_3 \cdot 6H_2O$, $VOBr$, $VOBr_2$ or $VOBr_3$, and iodides including $VI_2$, $VI_3 \cdot 6H_2O$ or $VI_4$; vanadium sulfates including $VSO_4 \cdot 7H_2O$, $V_2(SO_4)_3$, $VOSO_4$ or $(VO)_2(SO_4)_3$; vanadates including orthovanadates, represented by the generic formula: $M_3VO_4$, pyrovanadates, represented by the general formula $M_4V_2O_7$ and metavanadates, represented by the general formula $MVO_3$ and the like where M represents a cation. The condensed vanadate ions which form in aqueous solutions, such as, $V_6O_{17}^4$ are also useful in this invention.

For convenience in introducing vanadate ions into the inhibiting systems of this invention the alkali metals, ammonium and alkaline earth vanadates including orthovanadates, pyrovanadates and metavanadates are preferred. Exemplary of such vanadates are the following: sodium metavanadate, potassium metavanadate, lithium metavanadate, ammonium metavanadate, sodium pyrovanadate, potassium pyrovanadate, lithium pyrovanadate, ammonium pyrovanadate, sodium orthovanadate, potassium orthovanadate, lithium orthovanadate, ammonium orthovanadate, calcium orthovanadate, calcium pyrovanadate, calcium metavanadate, magnesium orthovanadate, magnesium pyrovanadate, magnesium metavanadate, ferrous orthovanadate, ferrous pyrovanadate, ferrous metavanadate, copper orthovanadate, copper pyrovanadate copper metavanadate, and the like.

Other forms of vanadium that can be used in this invention include: the vanadovanadates, double vanadates, i.e., heteropoly acids containing vanadium and the peroxy vanadates having the general formula: MVO$_4$. The preferred cations represented by M are the alkali metal and ammonium cations.

The preferred antimony compounds used in this invention are: antimonyl compounds, such as, alkali metal antimonyl tartrates, alkali metal antimonyl gluconates and other such antimony derivatives of polyhydroxy organic acids, wherein the aliphatic carboxylic acid moiety has from about 2 to about 6 carbon atoms. A preferred antimonyl compound is potassium antimonyl tartrate having the formula: K(SbOH$_2$)C$_4$H$_2$O$_6$·½H$_2$O as well as sodium antimonyl tartrates. When alkali metal antimonyl tartrates are used in the combination of the instant invention, small amounts of tartaric acid, that is about 1.0% to about 50% by weight of the antimony compound is also preferably employed for improved stability.

Other antimony compounds which can be used in the process of this invention include antimony trioxide or pentoxide reaction products with orthodihydric phenols, sugar alchohols, and similar hydroxy compounds which form definite but complex compounds.

Additional antimonyl compounds which can be used in this invention include oxides of antimony such as antimony trioxide, Sb$_2$O$_3$, antimony tetroxide, Sb$_2$O$_4$, antimony pentoxide, Sb$_2$O$_5$, alkali metal metaantimonites, and pyro-antimonates and meta-antimonates, antimony sulfates, and the like.

For convenience in introducing the antimony compounds into the aqueous alkanolamine solutions, it is preferred to employ them in conjuction with solubilizing or chelating agents, such as, tartaric acid, ethylene diaminetetraacetic acid, and the like.

Still another group of antimony compounds which can be used are antimony-carbon compounds, i.e., organometallic compounds of antimony. These are exemplified by the arylstibonic acids having a generic formula

ArSbO$_3$H$_2$ where Ar represents an aryl group. Specific examples include para-amino-benzene stibonic acid,

p-NH$_2$C$_6$H$_4$SbO$_3$H$_2$, para-diethylaminobenzene stibamine, para-acetaminobenzene stibonic acid and its alkali metals, para-stiboso-acetanilide, OSbC$_6$H$_4$NHCOCH$_3$, and the like.

In using the antimony and vanadium compounds of this invention the respect compounds are mixed together such that there is a ratio of from about 1 to about 9 parts by weight, of antimony compound to about 9 to about 1 part by weight of vanadium compound. The preferred ratios are from about 4–6 parts to about 6–4 parts with equal parts being most preferred.

The combination of antimony and vanadium compounds is added in an amount of from about 0.01 to about 2.0 percent by weight based on the weight of the aqueous alkanolamine solutions including the weight of the water and the alkanolamine. These percentages apply to all of the corrosion inhibitors encompassed by the instant invention.

Another class of compounds which have been found useful as corrosion inhibitors for aqueous alkanolamine systems are tin compounds such as stannous salts exemplified by stannous tartrate, stannous gluconate, stannous chloride, stannous acetate, stannous fluoborate, and organo-tin compounds such as di-n-butyltin dimethoxide, n-butylstannoic acid, dimethyltin oxide and diethyltin dichloride. Stannous tartrate and stannous gluconate are preferred with stannous tartrate especially preferred.

Stannous tartrate and stannous gluconate are preferred compounds for they have been found to be soluble in amounts of at least one percent by weight and up to about two percent by weight in concentrated alkanolamines. For example, monoethanolamine can be sold as an inhibited product containing up to about 2 percent by weight of stannous tartrate and/or stannous gluconate making it easier to formulate an aqueous alkanolamine purification system at a plant.

Additional corrosion inhibitors are the nitro-substituted aromatic acids and their salts such as sodium-nitrobenzoate, sodium 4-nitrophthalate, p-nitrocinnamic acid and the like. These compounds may be oxidant-type inhibitors caused by effecting some anodic polarization, the mechanism perhaps involving chemisorption along with oxidation. Protection using these compounds as inhibitors tends to be relatively dependent upon temperature.

A further corrosion inhibitor for the aqueous alkanolamine systems comprising a part of the instant invention is benzotriazole. It has not yet been determined whether benzotriazole operates as an anodic inhibitor or also involves a significant cathodic contribution in this case.

Alkanolamine systems which are benefitted by the inclusion of the instant corrosion inhibitors are those mono and polyalkanolamines having from 2 to 4 carbon atoms per alkanol moiety. Typical alkanolamines are monoethanolamine, diethanolamine, and monoisopropanolamine.

The corrosion inhibitors of the instant invention were tested in monoethanolamine-water-carbon dioxide solutions because while aqueous monoethanolamine solutions by themselves are not corrosive towards ferrous metals, when saturated with carbon dioxide they become quite corrosive to mild steel. It is thought that electrochemical corrosion is involved with the anodic reaction expected to produce products such as ferrous hydroxide, ferrous carbonate or certain complexes.

In some of the examples, metal strips 3" x 1½" x ¹⁄₁₆" were cleaned by scrubbing with a bristle brush employing a mild abrasive, followed by rinsing with water and acetone. The dry, clean metal strips were then weighed and placed upright in a 600 ml. glass cell, after which the strips were separated by means of Z-shaped glass rods. The strips were covered by adding 400 milliliters of the monoethanolamine test solution that had previously been loaded at room temperature with carbon dioxide. Each cell was then fitted with a reflux condenser, a sparging tube and a thermometer, and placed in a constant temperature bath. The solution was maintained at the test temperature for 72 hours while bubbling with carbon dioxide at a standard rate of 100 cc./min. The metal panels were cleaned by immersion in an inhibited hydrochloric acid solution for a short time, rinsing in water and acetone, and air drying. Weight loss was then determined.

Heat transfer effects relative to the corrosion of steel were measured as follows: A weighed steel plate (3" x 3" x ³⁄₁₆") was secured by means of a two-inch pipe joint arrangement to a 1000 milliliter flask. The plate was heated with a 500-watt soldering iron for which a special head had been made in order to lock the unit together. A Variac was employed to control the heat input and a thermocouple well was drilled half-way in from the edge of the plate to record the approximate metal temperature. The flask was fitted with a reflux condenser, a thermometer, and a sparging tube. In all tests the heat input was sufficient to maintain a vigorous boiling for the 72 hour period while bubbling with carbon dioxide at a standard rate of 100 cc./min. To compare the effect of heating steel by immersion to that of having it the heating source, a 1½" x 1½" x ¹⁄₁₆" panel of the same steel was suspended by a hook in the solution. In dilute monoethanolamine solutions, the corrosion rate of the heat transfer plate was found to be significantly greater than that of the immersed panel. The metal plates and panels were cleaned after testing by immersion in an inhibited hydrochloric acid solution for a short time, rinsed in water and acetone, and air dried. Corrosion of steel was determined by both weight losses and appearance.

The corrosion of both mild steel and 304 stainless steel by monoethanolamine solutions under conditions of higher temperatures and pressures was studied using a Parr Series 4500 pressure reactor. Clean and weighed metal panels 3″ x ¾″ x 1/16″, suspended by hooks from a glass liner in the reactor, were completely covered by the monoethanolamine solution that had been treated with carbon dioxide at room temperature. After closing the reactor with its pressure head, carbon dioxide was bubbled through the solution to reduce oxygen availability. The unit was then heated at the desired temperature for 24 hours under the natural pressure developed by the solution. After this, the metal panels were cleaned by immersion for a short time in an inhibited hydrochloric acid solution, rinsing with water and acetone, and air drying.

The previously described test procedures were used in the following examples which are representative of this invention.

All parts and percentages are by weight unless otherwise specified.

EXAMPLE 1

In this example the equipment was designed such that the steel plate in question was also the heat source for maintaining vigorous boiling of the solution. A thermocouple reading indicated that the heat transfer plate temperature was about 120° C. for a 15 percent aqueous monoethanolamine solution whose bulk temperature was about 101° C. Test duration was 72 hours for all experiments with carbon dioxide sparging. Percent protection was calculated as follows:

$$\frac{\text{weight loss uninhibited} - \text{weight loss inhibited}}{\text{weight loss uninhibited}} \times 100$$

The results were as follows:

| Inhibitor and amount | Amine solution | Protection of mild steel, percent | | Appearance of heat transfer plate after test |
|---|---|---|---|---|
| | | Heat transfer plate | Suspended panel | |
| 0.1% sodium metavanadate | 15% MEA [1] | 85 | 85 | Good—possibly few pits. |
| | 30% MEA | 94 | 95 | pits. |
| | 15% HEED [2] | 0 | 0 | Like new. Severe crevice pits accounting for weight loss. |
| 0.1% potassium antimonyl tartrate and 0.01% tartaric acid. | 30% MEA | 83 | 80 | Slight general attack. |
| | 15% HEED | 95 | 28 | Like new. |
| 0.05% sodium metavanadate, 0.05% potassium antimonyl tartrate, and 0.005% tartaric acid. | 15% MEA | 93 | 92 | Do. |
| | 30% MEA | 96 | 97 | Do. |
| | 15% HEED | 97 | 90 | Do. |

[1] Monoethanolamine.
[2] N(2-hydroxyethyl)ethylenediamine.

EXAMPLE 2

Example I was repeated with the exception that the following vanadium compounds were used instead of sodium metavanadate: vanadium pentoxide, sodium orthovanadate hexadecyl hydrate, sodium pyrovanadate, and sodium tetravanadate. The results of protection of the heat transfer plates and suspended panels of mild steel are shown below:

| Vanadium compound added with like concentration of potassium antimonyl tartrate [1] to 30% MEA—$H_2O$—$CO_2$ solution | Percent protection of mild steel | |
|---|---|---|
| | Heat transfer plate | Suspended panel |
| 0.0375% vanadium pentoxide | 92 | 93 |
| 0.195% sodium orthovanadate hexadecylhydrate | 98 | 94 |
| 0.062% sodium pyrovanadate | 93 | 93 |
| 0.044% sodium tetravanadate | 91 | 94 |

[1] 0.05% potassium antimonyl tartrate and 0.005% tartaric acid.

EXAMPLE 3

The lack of criticality of the form of vanadium used in formulating the combination of vanadium and antimony compounds was demonstrated by using mixtures of vanadium pentoxide and aqueous caustic plus hydrogen peroxide or sodium peroxide and by mixing sodium decavanadate with aqueous sodium hydroxide. The corrosion test of these mixtures are shown below:

LABORATORY HEAT TRANSFER CORROSION TESTS WITH SODIUM VANADATE SOLUTIONS PREPARED FROM DIFFERENT VANADIUM COMPOUNDS

| Vanadate-containing solution added with 0.03% potassium antimonyl tartrate [1] to a 20% MEA—$H_2O$—$CO_2$ solution | Percent protection of mild steel | |
|---|---|---|
| | Heat transfer plate | Suspended panel |
| Equivalent to 0.35% $NaVO_3$ prepared by mixing a high purity $V_2O_5$ into water containing a stoichiometric amount of NaOH plus a small amount of $H_2O_2$ | 90 | 87 |
| Equivalent to 0.035% $NaVO_3$ prepared by mixing a high purity $V_2O_5$ into water containing a stoichiometric amount of NaOH and $Na_2O_2$ | 81 | 86 |
| Equivalent to 0.035% $NaVO_3$ prepared by mixing sodium decavanadate into water containing a stoichiometric amount of NaOH | 90 | 87 |
| 0.035% $NaVO_3$ (Foote Mineral Company) | 90 | 86 |

[1] Plus 0.003% tartaric acid.

EXAMPLE 4

When combinations of sodium metavanadate with a number of antimony compounds were used in corrosion protection experiments as previously described results similar to those described in the prior examples were obtained. These antimony compounds included antimony tartrate, antimony lactate, sodium antimony tartrate with tartaric acid, and antimony pentachloride. The corrosion data obtained with mild steel test panels are shown in the table below together with the relative concentrations of the corrosion inhibitors.

| Antimony compounds [1] added with like concentration of sodium metavanadate [2] to 30% aqueous MEA solution sparged with $CO_2$ | Percent protection of mild steel [3] | |
|---|---|---|
| | Heat transfer plate | Suspended panel |
| 0.036% antimony tartrate | 90 | 95 |
| 0.0183% antimony lactate | 89 | 97 |
| 0.030% tartar emetic, 0.003% tartaric acid | 88 | 94 |
| 0.0285% sodium antimonyl tartrate, .0029% tartaric acid | 95 | 93 |
| 0.0270% antimony pentachloride | 94 | 92 |

[1] Concentrations were selected to provide 0.011% antimony in each test run.
[2] 0.035% sodium metavanadate.
[3] Calculated by formula:

$$\text{Percent protection} = \frac{\text{Wt. loss of uninhibited} - \text{wt. loss of inhibited}}{\text{Wt. loss of uninhibited}} \times 100$$

EXAMPLE 5

Aqueous monoethanolamine solutions containing 15 weight percent monoethanolamine and which had been treated with carbon dioxide at room temperature were placed into a Parr Series 4500 pressure small reactor which was then closed, heated and allowed to develop up to the natural pressure of the solution. Corrosion studies were run with an uninhibited solution and one containing 0.05 percent sodium metavanadate, 0.05 percent potassium antimonyl tartrate and 0.005 percent tartaric acid on samples of cold-rolled mild steel and 304 stainless steel. The operating conditions and results are set out below:

|  | Unihhibited | | Inhibited | |
|---|---|---|---|---|
| Evaluation conditions: | | | | |
| Temperature, °C | 100 | 125 | 100 | 125 |
| Pressure reading, p.s.i | 120 | 200 | 110 | 250 |
| Time, hours | 24 | 24 | 24 | 24 |
| Corrosion losses, mils per year: | | | | |
| Cold-rolled mild steel | 20 | 20 | <1 | <1 |
| 304 stainless steel | <1 | <1 | Nil | Nil |

EXAMPLE 6

To test the effect of the corrosion inhibitors of the instant invention under more severe conditions, the antimony-vanadate combination was compared to the individual additives in corrosion tests with aqueous monoethanolamine solutions containing 65 weight percent monoethanolamine at the boiling point of the solutions that were continuously sparged with carbon dioxide. The purpose of these conditions is that they offer a more rapid and severe means for evaluating inhibitors. After 72 hours under these conditions, corrosion of steel panels was determined as in the previous examples by comparing weight losses to similar panels immersed in uninhibited solutions. It is apparent from the following results with duplicate and sometimes triplicate experiments that reproducibly satisfactory protection was realized with the combination but not with the individual additives.

| Inhibitor and amount, percent | | Range of percent protection of mild steel |
|---|---|---|
| Sodium metavanadate | Potassium antimonyl tartrate | |
| 0.1 | 0 | 42–99 |
| 0 | 0.1 | 0–16 |
| 0.05 | 0.05 | 99±1 |
| 0.05 | 0 | 70–99 |
| 0 | 0.05 | 0 |
| 0.025 | 0.025 | 99±1 |

The poor reproducibility with sodium metavanadate alone is characteristic of anodic inhibitors at a borderline concentration and sometimes this is evidenced by severe localized attack.

EXAMPLE 7

In this example, one of the tin compounds of the instant invention, stannous tartrate, was evaluated at various concentrations under heat transfer conditions for its protection of mild steel in two different systems made up of monoethanolamine, water, carbon dioxide and stannous tartrate. All of hte solutions were constantly sparged with carbon dioxide. The results were as follows:

| Test | Weight percent of stannous tartrate | Percent protection [1] |
|---|---|---|
| 15 [2] | 0.005 | 66 |
| | 0.01 | 73 |
| | 0.025 | 77 |
| | 0.05 | 87 |
| | 0.1 | 87 |
| 65 [3] | 0.005 | 7 |
| | 0.01 | 85 |
| | 0.025 | 92 |
| | 0.05 | 95 |
| | 0.1 | 93 |

[1] Percent protection of immersed mild steel panels calculated by:

$$\frac{\text{Wt. loss uninhibited} - \text{wt. loss inhibited}}{\text{Wt. loss uninhibited}} \times 100$$

[2] A solution containing 15 weight percent monoethanolamine heated at approximately 101° C. for three days.
[3] A solution containing 65 weight percent monoethanolamine heated at approximately 107° C. for three days.

The following example was undertaken in order to test the sodium metavanadate, potassium antimonyl tartrate and tartaric acid inhibitor system under actual plant conditions.

EXAMPLE 8

An ammonia plant having a capacity of 1,000 tons per day employing the Girbitol process for absorption of residual carbon dioxide from the hydrogen stream was investigated having an 18% aqueous monoethanolamine solution as the acid gas absorption medium.

The inhibitor combination comprised sodium metavanadate and potassium antimonyl tartrate at a concentration level of 0.05% each with 0.005% tartaric acid.

The first corrosion evaluation method used was the determination of weight losses of metal specimens contained in racks located strategically in the plant streams. The following results were obtained before and after addition of the inhibitor combination:

| Location of corrosion rack (4 metal specimens each) [1] | Average steel corrosion rate, m.p.y.[2] | |
|---|---|---|
| | Before inhibitors added | After inhibitors added |
| At the rich to lean amine solution heat exchanger on the lean side | 2.8 | 0.8 |
| Rich amine solution down stream of hydraulic turbine | 227 | 0.4 |

[1] Flow rate of approximately 5 gal./min. maintained through corrosion racks.
[2] Mils per year as calculated from weight losses after 5 to 22 days exposure.

The second method of evaluation employed Model CK-2 "Corrosometer." Herein, probes of the metals of interest were immersed in the plant steam and the metal loss was measured by changes in the electrical resistance of the probes. The following readings which were taken over a period of several months confirm the efficiency of the inhibitor combination for both steel and 304 stainless steel.

CORROSOMETER READINGS WITH PROBES IN AMINE SOLUTION

| Type of metal | Average indicated corrosion rate, m.p.y. | |
|---|---|---|
| | Before inhibitor addition | After inhibitor addition |
| Mild steel | 550 | Nil. |
| 304 stainless steel | 1.75 | Nil. |

The same plant was inspected further during a "turn around" period for evidences of corrosion during the five months period following inhibitor addition. The tube side of the lean-rich heat exchanger was examined since corrosion, particularly of the baffle plate, had been a problem with the uninhibited amine solution. After five months of operation with the inhibitor, no attack was evident on any of the component parts. Moreover, the top sections of the stripper columns and manifold lines to the tube side of the heat exchanger that had frequently been perforated by the uninhibited solution did not develop any leaks during the period of operation with the inhibitor combination.

EXAMPLE 9

Using the same techniques as described in the Example 4, additional species of tin compounds were evaluated as to their ability to inhibit corrosion of steel under heat transfer conditions. The test revealed the following information:

| Tin compound weight | Amine solution | Percent protection | |
|---|---|---|---|
| | | Heat transfer plate | Suspended panel |
| 0.025% stannous tartrate | 15% MEA [1] | 75 | 80 |
| 0.025% stannous gluconate | 15% MEA [1] | 75 | 80 |
| 0.05% stannous gluconate | 30% MEA [2] | 80 | 90 |
| 0.05% stannous tartrate | 30% MEA [2] | 90 | 95 |
| 0.05% stannous chloride | 30% MEA [2] | 85 | 90 |
| 0.05% stannous acetate | 30% MEA [2] | 70 | 90 |
| 0.05% stannous fluoborate | 30% MEA [2] | 70 | 85 |
| 0.1% potassium stannate | 30% MEA [2] | 0 | 0 |
| 0.05% stannic chloride | 30% MEA [2] | 0 | 0 |
| 0.05% di-n-butyltin dimethoxide [3] | 30% MEA [2] | 85 | 85 |
| 0.05% n-butylstannoic acid [3] | 30% MEA [2] | 45 | 70 |
| 0.05% stannous tartrate | 30% 1/1 MEA/HEED [4] | 90 | 80 |
| 0.05% stannous gluconate | 30% 1/1 MEA/HEED [4] | 5 | 15 |

[1] Aqueous monoethanolamine solution having 15 weight percent monoethanolamine.
[2] Aqueous monoethanolamine solution having 30 weight percent monoethanolamine.
[3] Incompletely soluble in the test solution.
[4] Aqueous solution containing 30 weight percent of a 1/1 by weight mixture of monoethanolamine and N(2-hydroxyethyl)ethylenediamine.

It is pointed out that tin inorganic salts where the valence state is +4, e.g., stannic chloride and potassium stannate, often do not appear to be inhibitive.

EXAMPLE 10

Tests equivalent to those conducted in the previous example were run using certain nitrosubstituted aromatic acids and/or salts and benzotriazole and the results are set forth herein:

| Inhibitor | Amount, percent | Test | App. temp., °C. | Percent protection |
|---|---|---|---|---|
| Sodium m-nitrobenzoate | 0.5 | [1] 65 | 107 | 80 |
| | 0.5 | [2] 15 | 101 | 95 |
| | 0.05 | 15 | 80 | 95 |
| Sodium 4-nitrophthalate | 0.5 | 15 | 80 | 95 |
| | 0.5 | 15 | Room | 90 |
| | 0.05 | 15 | 80 | 90 |
| Benzotriazole | 0.05 | 65 | 107 | 20 |
| | 0.05 | 15 | 101 | 90 |
| | 0.01 | 15 | 101 | 10 |

[1] Aqueous monoethanolamine solution containing 65 weight percent monoethanolamine at indicated temperature for three days.
[2] Aqueous monoethanolamine solution containing 15 weight percent monoethanolamine at indicated temperature for three days.

EXAMPLE 11

Certain additional corrosion inhibitors were evaluated under heat transfer conditions as performed in Example 4. The results were as follows:

| Inhibitor, percent | Amine solution | Percent protection of mild steel | |
|---|---|---|---|
| | | Heat transfer plate | Suspended panel |
| 0.5% sodium m-nitrobenzoate | 15 | 89 | 50 |
| 0.1% nitroterephthalic acid | 15 | 87 | 0 |
| 0.5% benzotriazole | 15 | 20 | 87 |

Although the invention has been described in its preferred forms with a certain degree of particularity, it is understood that the present disclosure of the preferred forms has been made only by way of example and that numerous changes may be resorted to without departing from the spirit and scope of the invention.

What is claimed is:

1. A corrosion inhibited composition consisting essentially of an aqueous alkanolamine solution employed in acid gas removal service and an inhibiting amount of a combination of about 9 to about 1 parts by weight of a vanadium compound to about 1 to about 9 parts by weight of an antimony compound, said vanadium and antimony compounds being at least partially soluble in said aqueous alkanolamine solution and said vanadium compound providing vanadium-containing anions wherein vanadium is present in the plus five valence state in said aqueous alkanolamine solution.

2. Composition claimed in claim 1 wherein the vanadium compound is an alkali metal metavanadate and the antimony compound is an alkali metal antimonyl tartrate.

3. Composition claimed in claim 1 wherein the vanadium compound is an ammonium vanadate and the antimony compound is an alkali metal antimonyl tartrate.

4. Composition claimed in claim 2 wherein the alkali metal metavanadate is sodium metavanadate and the alkali metal antimonyl tartrate is potassium antimonyl tartrate.

5. Composition claimed in claim 2 containing in addition about 1.0% to about 50% by weight of tartaric acid based on the weight of said alkali metal antimonyl tartrate.

6. Composition claimed in claim 1 wherein the vanadium compound is a vanadium oxide.

7. Composition claimed in claim 6 wherein the vanadium oxide is a vanadium pentoxide.

8. Composition claimed in claim 1 wherein the antimony compound is a derivative of an antimony oxide and a chelating agent.

9. Composition claimed in claim 1 wherein the antimony compound is a reaction product of an antimony oxide and an ortho dihydric phenol.

10. Method for inhibiting corrosion of metallic surfaces by an aqueous alkanolamine solution employed in acid gas removal service comprising adding to said aqueous alkanolamine solution an inhibiting amount of a combination of about 9 to about 1 parts by weight of a vanadium compound to about 1 to about 9 parts by weight of an antimony compound, said vanadium and antimony compounds being at least partially soluble in said aqueous alkanolamine solution and said vanadium compound providing vanadium-containing anions wherein vanadium is present in the plus five valence state in said aqueous alkanolamine solution.

11. Method claimed in claim 10 wherein said aqueous alkanolamine solution is an aqueous monoethanolamine system.

12. Method claimed in claim 10 wherein said corrosion inhibitor is present in an amount of from about 0.01 to about 2.0 percent by weight based upon the weight of said aqueous alkanolamine solution.

13. Method claimed in claim 10 wherein the vanadium compound is an alkali metal vanadate and the antimony compound is an alkali metal antimonyl tartrate.

14. Method claimed in claim 10 wherein the vanadium compound is an ammonium vanadate and the antimony compound is an alkali metal antimonyl tartrate.

15. Method claimed in claim 13 wherein the alkali metal vanadate is sodium metavanadate and the alkali metal antimonyl tartrate is potassium antimonyl tartrate.

References Cited
UNITED STATES PATENTS

| | | | |
|---|---|---|---|
| 2,031,632 | 2/1936 | Bottoms | 252—192 |
| 2,869,978 | 1/1959 | Fischer | 423—228 |
| 3,265,620 | 8/1966 | Heiman | 252—389 R |

LELAND A. SEBASTIAN, Primary Examiner

I. GLUCK, Assistant Examiner

U.S. Cl. X.R.

252—189, 192, 387; 423—229; 21—2.7 R

UNITED STATES PATENT OFFICE
CERTIFICATE OF CORRECTION

Patent No. 3,808,140              Issue Date April 30, 1974

Inventor(s) Blake F. Mago and Charles W. West

It is certified that error appears in the above-identified patent and that said Letters Patent are hereby corrected as shown below:

In the title after "Blake F. Mago, 10 Elyse Drive, New City, N.Y. 10956 and Charles W. West, 301 78th Street, Niagara Falls, N.Y. 14304" add --assignors to UNION CARBIDE CORPORATION, New York, N.Y.--.

Signed and sealed this 8th day of October 1974.

(SEAL)
Attest:

McCOY M. GIBSON JR.
Attesting Officer

C. MARSHALL DANN
Commissioner of Patents